United States Patent [19]
Witonsky

[11] 3,942,467
[45] Mar. 9, 1976

[54] TIME TEMPERATURE INDICATOR

[75] Inventor: Robert J. Witonsky, Princeton, N.J.

[73] Assignee: Bio-Medical Sciences, Inc., Fairfield, N.J.

[22] Filed: Jan. 21, 1974

[21] Appl. No.: 435,067

[52] U.S. Cl............ 116/114 V; 23/253 TP; 58/1 R; 116/114.5; 426/88; 426/524
[51] Int. Cl.² ...................... G01K 11/00; G04F 1/00
[58] Field of Search ..... 116/114.5, 114 AM, 114 V; 73/356, 292; 23/253 R, 253 TP; 426/88, 524; 58/1 R

[56] References Cited
UNITED STATES PATENTS

| | | | |
|---|---|---|---|
| 2,560,537 | 7/1951 | Andersen | 116/114 AM |
| 2,567,445 | 9/1951 | Parker | 23/253 R X |
| 2,809,116 | 10/1957 | Laskowski | 426/88 |
| 3,046,786 | 7/1962 | Tessem | 116/114 AM |
| 3,520,124 | 7/1970 | Myers | 58/1 R |
| 3,625,655 | 12/1971 | Culp, Jr. et al. | 23/253 R |
| 3,701,633 | 10/1972 | Davis | 116/114 AM X |
| 3,791,794 | 2/1974 | Tomkin | 23/253 TP |
| 3,868,218 | 2/1975 | Törnmarck et al. | 28/253 R |

Primary Examiner—Richard C. Queisser
Assistant Examiner—Daniel M. Yasich
Attorney, Agent, or Firm—Anthony Lagani, Jr.

[57] ABSTRACT

A system operable to signal the attainment of one or more preselected time-temperature integrals which monitor the temperature history of a product utilizes an organic compound which is subject to solvolysis with the generation of an acid, at least one base in an amount less than the stoichiometric equivalent of the acid generated, and a pH sensitive indicator.

9 Claims, 1 Drawing Figure

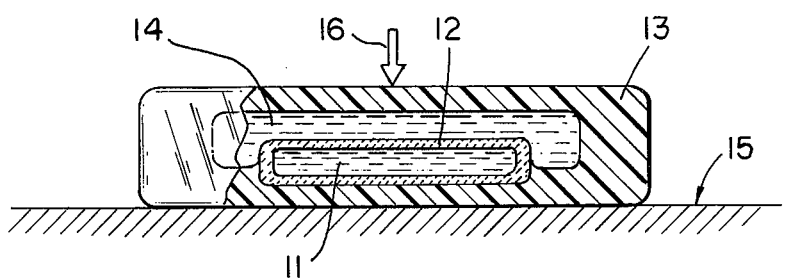

TIME TEMPERATURE INDICATOR

DETAIL DESCRIPTION

The present invention pertains to an indicator system which signals the attainment of at least one pre-selected time-temperature integral.

The desirability of detecting whether or not a frozen product has been allowed to thaw has long been recognized and numerous tell-tale devices are described in the literature. One class of these relies upon material which is frozen but which melts at some pre-selected temperature so as to irreversibly activate an indicator, either chemically or physically. Typically of these devices are those described in the following U.S. Pat.:

| Nos. 1,917,048 | Nos. 2,753,270 | Nos. 2,955,942 |
|---|---|---|
| 2,216,127 | 2,762,711 | 3,047,405 |
| 2,277,278 | 2,788,282 | 3,055,759 |
| 2,340,337 | 2,823,131 | 3,065,083 |
| 2,553,369 | 2,850,393 | 3,194,669 |
| 2,617,734 | 2,852,394 | 3,362,834 |
| 2,662,018 | 2,951,405 | 3,437,010 |

All of the above devices merely signal "thaw" with no attempt to measure the period during which the product is thawed or the temperature which the product attains while thawed.

A second class of known indicators which utilize diffusion or capillary action with a wick or similar permeable member provides some degree of gradation and is typified by the devices of the following U.S. Pat.:

| Nos. 2,560,537 | Nos. 3,243,303 |
|---|---|
| 2,716,065 | 3,414,415 |
| 2,951,764 | 3,479,877 |
| 3,118,774 | |

It is now recognized that various natural and synthetic materials deteriorate with the passage of time even when taking such precautions as storing under refrigeration packaging in an inert atmosphere, sterilization, and adding spoilage retardants. Thus, for example, foods, films, pharmaceuticals, biological preparations and the like, can demonstrate decomposition with the passage of time, even when sterilized or maintained at sufficiently low temperatures to preclude microbiological degradation. Such decomposition occurs for various reasons, including strictly chemical reactions, such as oxidation, and enzymatic processes. Consequently, there is for each material of this type, a limit to its permissible storage life at which time a discernible change in some property occurs. A system which would indicate when this limit has been exceeded would be extremely valuable.

The deterioration kinetics involved in such processes, however, can be exceedingly complex. For example, while it is clear that deterioration is a function of temperature, the rate of deterioration of such products can also vary with temperature so that one rate of deterioration will exist at a first temperature with a different rate at a second temperature. The total amount of deterioration will depend upon the time at which the product is held at each temperature; i.e., the integral of time and temperature. The practical effect of this can be seen for example from two identical samples of frozen food packaged simultaneously. For both of these, there will be a finite time-temperature integral until a discernible change in quality occurs. If one package is allowed to rise in temperature by 10° or 20°C, even without thawing, in the course of distribution or storage, its life will be reduced as compared with the other package which was maintained at a lower temperature for its entire storage life. A consumer about to purchase these packages, both of which are now stored at normal freezer temperature, has no way of ascertaining this difference in temperature histories.

Systems have been suggested for monitoring the temperature history of a product. Thus U.S. Pat. No. 2,671,028 utilizes an enzyme such as pepsin in indicator systems while U.S. Pat. No. 3,751,382 discloses an enzymatic indicator in which urease decomposes urea with the reaction products causing a change in the pH of the system. The activity of the enzyme, and thus rate of decomposition, is dependent on temperature so that the change in pH resulting from this decomposition can be monitored by conventional acid-base indicators. This type of system, which appears to be directed at the specific problem of microbiological putrefaction rather than the broader problem of monitoring temperature histories, suffers however from the inherent limitations of any enzymatic reaction. Thus while enzyme activity is a function of temperature, it is also sensitive to the very passage of time being measured, enzymatic activity generally decreasing with time. Enzyme activity is also sensitive to pH change and such change is the operative factor in, for example, the system of U.S. Pat. No. 3,751,382. Finally, a more sophisticated system is described in U.S. Pat. No. 3,768,976 in which time temperature integration is achieved by monitoring oxygen permeation through a film through use of a redox dye.

A basic problem is the fact that the second derivative of time-temperature decomposition (the change in rate per unit of temperature change) differs for different products. Thus the change in the rate of deterioration per unit of temperature change for certain fruits and berries is vastly different from the change in rate for lean meats. The values for dairy products are different from both. Consequently, a system which is dependent on a single enzymatic reaction or the permeability of a given film will be suitable as an indicator only for those materials having a similar slope for their relationship of change of rate of decomposition to temperature. Although U.S. Pat. No. 3,751,383 describes a method for modifying the time at which the indicator's color change occurs, the activation energy of the enzyme system is modified only slightly and the ratio of change in reaction rate per temperature unit remains substantially the same.

The present invention pertains to an indicator system which is extremely simple and reliable in operation. Not only is it possible to control the time-temperature integral at which the present system signals, different relationships of rate change per unit temperature can be accommodated. It is also possible and indeed often desirable to provide a plurality of signals; e.g., one signal when 50% of a product's life has passed and a second different signal when 90% has passed.

The present system is not limited in application to monitoring long storage periods at low temperatures. The same considerations apply to short periods and to high temperature. Thus the present system can also be used to insure, for example, that products have been adequately heat sterilized. The indicator is thus admirably suited to insure that canned goods which are autoclaved, have been subjected to the appropriate time-temperature integral required to obtain a necessary degree of microorganism kill. In this case, the firing of the indicator is used as the signal that the necessary parameters have been reached or exceeded, e.g., 120° for at least 15 minutes. Similarly, the present indicator can be used to insure that surgical instruments have been subjected to appropriate sterilization conditions, that pharmaceuticals have not been stored for periods in excess of that which is permissible, that dairy products have been properly pasteurized, and the like. Various other applications in which it is desirable to know the temperature history of a product are immediately apparent.

The first component of the present indicator is an organic component which is subject to solvolysis with the resultant generation of an acid. Generally such solvolytic decomposition should follow first order kinetics, or rather close to first order kinetics. A wide variety of materials are suitable as this component. Thus one can employ various acid derivatives, as for example, symmetrical and mixed acid anhydrides, acid halides, in particular acid chlorides and acid bromides, esters, lactones and the like. Virtually any derivative which yields an acid upon solvolysis can be used since the critical properties of the organic compound are the rate constant of the solvolysis's reaction and the activation energy of the reaction, not the particular structure of the organic compound.

Other organic compounds which are subject to solvolysis include the halides, in particular the chlorides and bromides. Typical halides of this type are the alkyl halides, alkenyl halides, haloalkanols, aralkyl halides, aralkenyl halides and the like.

The second component of the present invention is the solvolysis medium. This may be a polar organic solvent or an aqueous solvent. By the term aqueous solvent is intended a liquid phase which contains some proportion of water, from a fraction of a percentage to 100% of its composition. As will be seen hereafter purely organic solvents can also be employed, alone or in combination. The solvent system can also include one or more additional organic solvents which are essentially inert with respect to the organic compound and the acid which it generates. Suitable solvents include lower alkanols such as ethanol; liquid ketones such as acetone and methylethylketone; dimethylsulfoxide; ethers such as diglyme, dioxane and tetrahydrofuran; and the like.

The third component of the present invention is at least one alkaline material of sufficient basicity to neutralize the acid material which is generated in the solvolysis reaction. This material can be practically any base, as for example, sodium hydroxide, potassium hydroxide, sodium carbonate, triethylamine and the like. The amount of this material will be less than the stoichiometric equivalent of the total amount of acid which can be generated and will correspond to the amount of acid which will have been generated at a pre-selected time-temperature integral. Advantageously, there can be two or more alkaline materials of different basicity with the stronger base neutralizing the acid generated first, and the weaker base then becoming operative after all the stronger base has been consumed.

The fourth component of the present invention is a pH sensitive dye which undergoes a discernible color change upon neutralization of the alkaline material. The discernible change can be from one color to a second color, from colorless to one color or from one color to colorless. The pH sensitive dye will thus undergo a color change at that point at which all the alkaline is neutralized and pH of the system drops as continued acid is generated by the hydrolysis of the organic compound. In the further embodiment described above in which there are more than one alkaline materials of different basicities, a corresponding member of pH sensitive dyes can be provided so that a plurality of color changes will occur, all at pre-selected time-temperature integrals. It is thus possible to signal various fractions of a product's usable storage life, or to indicate different stages of heat sterilization such as, "not safe", "sterilized" and "oversterilized", all with a single system.

As noted above, the quotient of (a) the rate of change at one temperature of an article's property whose deterioration is being monitored to (b) the rate of change at a lower temperature differs for various materials. This value is often expressed for 10 degree increments and represented by the symbol "$Q_{10}$" for the Centigrade scale and "$a_{10}$" for the Fahrenheit scale. For example, within the range of 0° to $-20°C$, raw fatty meat and pre-cooked fatty meat have $Q_{10}$'s of about 3, whereas raw lean meat and pre-cooked lean meat have $Q_{10}$'s between 5 and 6. Vegetables generally have a $Q_{10}$ of between 7 and 8, whereas fruits and berries have a $Q_{10}$ of approximately 13. Systems can thus be selected so that their change in rate of development per unit change in temperature approximates the $Q_{10}$ of a given food class and for this purpose, one utilizes the activation energy values of the operative component.

The relationship between $Q_{10}$ and the activation energy is as follows:

$$Q_{10} = e^{10 E_a / T_1 \cdot T_2 \cdot R} \qquad 1$$

where
- $E_a$ = the activation energy
- $T_1$ = a first temperature in degrees (absolute)
- $T_2$ = a second temperature 10° lower than $T_1$ and
- $R$ = the gas constant. Within, for example, the range of $-10°$ to $-20°C$, an important region for frozen foods, the following values are obtained:

| $E_a$ Kcal/mole | $Q_{10}$ | $q_{10}$ | $E_a$ Kcal/mole | $Q_{10}$ | $q_{10}$ |
|---|---|---|---|---|---|
| 0.0 | 1.00 | 1.00 | 20.0 | 4.54 | 2.31 |
| 5.0 | 1.46 | 1.23 | 22.0 | 5.28 | 2.52 |
| 8.0 | 1.83 | 1.40 | 25.0 | 6.63 | 2.86 |
| 10.0 | 2.13 | 1.52 | 27.0 | 7.71 | 3.11 |
| 12.0 | 2.48 | 1.66 | 30.0 | 9.61 | 3.52 |
| 15.0 | 3.11 | 1.88 | 33.0 | 12.1 | 4.00 |
|  |  |  | 34.0 | 13.0 | 4.16 |

It is thus possible to prepare indicators which parallel the decomposition rates of various materials, even in the course of temperature fluctuation, over a period of time. The point at which a signal should be given by the indicator depends upon the development property being monitored. For example, if a discernible change in the taste of a product is known to occur after 500 hours at 0°C, the indicator might be formulated so as to undergo a color change at or just prior to 500 hours at 0°C. It will of course be appreciated that the same discernible change might occur in the product in about 60 hours at 20°C or in less than 10 hours at about 40° and that this pattern of changes in rate with temperature corresponds to the $Q_{10}$ value discussed above. Alternatively one can design the indicator so that it fires at some intermediate point; e.g., at 75% of the high quality shelf life of the product.

While the concept of the $Q_{10}$ value is generally applied to food deterioration, it is also useful in the design of indicators for other applications. Thus for example, the effect of temperature and time in heat sterilization follows a similar relationship. The rate of bacterial kill at one temperature; e.g., 110°C, increases by a factor of about 8 with each 10°C increment in temperature. One can thus construct an indicator system according to the present invention which accurately monitors the degree of bacterial kill during heat sterilization even though that sterilization is not isothermic.

Selection of the organic compound and design of the system also requires consideration of well known or easily determined values for solvolysis half-lives ($t_{1/2}$). Since solvolysis reactions decrease asymptotically as the concentration decreases, the system should be selected so that it has a solvolysis half-life at the anticipated temperature at least as great as the time during which the product is being monitored. In this way, the generation of acid as a function of time is relatively linear. A great degree of latitude is possible in this selection. Thus acid anhydrides and halides hydrolyse several orders of magnitude faster than esters. Within a given class, structural variation will permit further choice; e.g., an ester of acetic acid will have a longer half-life than the corresponding ester of trichloroacetic acid and benzydryl chloride will have a longer half-life than benzhydryl bromide.

Finally, after selection of an organic compound having approximately the appropriate half-life, further control can be achieved by solvent selection. For example, if the organic compound is tertiary butyl chloride and the solvent is aqueous ethanol, one can vary the half-life at 25°C from 36 seconds using 90% water and 10% ethanol to 4.84 days using 10% water and 90% ethanol. These periods of time are of course longer at lower temperatures.

The particular organic compound selected thus depends upon the desired application. If the indicator is to monitor the thermal history of frozen foods, one would select a compound having a half-life at −18°C (the normal storage temperature for frozen foods) on the order of several months. On the other hand, if one is monitoring heat sterilization, the half-life need only be about 10 to 20 minutes at 120°C. It is to be appreciated that the half-life value does not determine when firing of the indicator will occur, but rather is a factor which insures that the isothermal generation of the acid is substantially linear, thereby giving greater control over the point at which firing occurs.

After selection of the initial amount of organic compound which generates the acid and determination of the amount of base to give a signal at the desired time-temperature integral, a pH sensitive dye is selected which changes color just below the pH of the base. For example, utilizing sodium hydroxide as the alkaline material, xylenol blue can be used as the indicator dye. With potassium phosphate as the alkaline material, methyl red is a suitable indicator. In order to provide for the necessary signal, an amount of alkaline material is added in accordance with the following expressions:

$$C_B = C_x(1-e^{-kt}) \qquad 2$$

in which
 $C_x$ = the initial molar concentration of organic compound
 $C_B$ = the molar concentration of the alkaline material
 $k$ = the rate constant at the selected temperature, and
 $t$ = time at which the indicator is to change color.

The FIGURE depicts an embodiment of the invention in cross section wherein the organic compound is separated from an aqueous solvent and the alkaline material by a rupturable barrier.

The total amounts of the individual components are determined by such consideration as the manufacturing processes, costs, material compatibilities, application and the like and these factors are in turn largely determined matters of convenience and design objections. Since the system will commence its development as soon as the organic compound and the solvolysis solvent are brought in contact, it is apparent that these two components must be separated until such time as activation of the system is desired. Thus, the aqueous solvent 11 is enclosed in a rupturable container 12 which in turn is encased in an outer container 13 which also carries the organic compound 14 as pure material or in a non aqueous but water miscible solvent. The alkaline material and pH sensitive dye are dissolved in the aqueous solvent 11. Outer container 13 is transparent and fabricated from a chemically inert resilient material such as polyethylene, neoprene or the like and can be provided with an appropriate adhesive backing so as to be affixed to a product, shown generally at 15. By application of a slight pressure as at 16, the barrier is broken and the two components are allowed to mix.

It is of course also possible to merely bring the components together in the course of manufacture or to use any number of known two compartment containers as for example those described in U.S. Pat. Nos. 2,854,348; 3,055,759; 3,615,719; 3,695,903, or 3,703,077 or any of the devices described in the prior patents set forth above.

The following examples will serve to further typify the nature of the present invention but should not be construed as a limitation on the scope thereof.

Example 1

This example describes the design of a time-temperature integrating indicator suitable for monitoring the temperature history of frozen food.

Individual quick frozen boysenberries have a $Q_{10}$ of about 6 (this figure varying depending upon the individual processing and packaging parameters). It is determined by the packager that its product will have a high quality storage life of 300 days if stored at −18°C but only 50 days if the storage temperature is −8°C. The packager wishes to provide an indicator to indicate to the consumer when 50% of the high quality storage life had elapsed and when 90% of the high quality storage life had elapsed. Design and esthetic consideration limit the volume of the indicator to 0.1 ml.

From Equation 1, above, it is determined that the organic compound should have a solvolysis activation energy at the anticipated storage temperature of 22 to 25 Kcal/mole and a half life of at least 300 days. From published kinetics literature it can readily be determined that the activation energy for the solvolysis of tertiary butyl chloride in aqueous acetone is of this magnitude and with a solvent system containing 18% water, the half-life at −18°C is at least 300 days.

In order to provide an initial signal after 50% of the high quality storage life had elapsed and a second after 90% of the life had elapsed, two alkaline materials of different basicities are employed. The first is present in approximate 0.5 the molar concentration of the organic material and the second is present in approximately 0.27 the molar concentration of the organic material, these quantities being calculated from Equation 2. Sodium hydroxide is selected as the first alkaline material and potassium phosphate is selected as the second, weaker alkaline material. To provide the first signal, a pH sensitive dye which undergoes a color change at the neutralization point of the sodium hydroxide solution. Xylenol blue is selected on the basis of published data. Similarly a second pH sensitive dye which changes color at the neutralization point of the potassium phosphate solution is required and methyl red is selected for this purpose, it being desirable that the two dyes employed involve different color changes.

The following solutions are prepared:

| | Ingredients | Parts by volume/ indicator |
|---|---|---|
| A. | 1.0 molar aqueous sodium hydroxide | 3.0 |
| | 1.0 molar aqueous potassium phosphate | 1.7 |
| | 0.01 molar ethanolic xylenol blue | 0.21 |
| | 0.01 molar ethanolic methyl red | 0.2 |
| | water | 13.3 |
| B. | 1.0 molar tert.butyl chloride in anhydrous acetone | 6.0 |
| | anhydrous acetone | 80.6 |

Solution A and B are separated until use, for example by means of a rupturable barrier as shown in the FIGURE. Thus solution A can be disposed within rupturable container 12 which in turn is sealed in outer container 13 with solution B being disposed in the cavity filled by 14. Upon rupture of container 12, the ingredients mix and the solvolysis of the tert.butyl chloride begins. The mixture at this point is green.

After 150 days at −18°C, sufficient hydrochloric acid will have been generated to neutralize all of the sodium hydroxide. Since the tert.butyl chloride is in excess, hydrochloric acid will continue to be generated and accordingly the xylenol blue will undergo a color change. This dye becomes colorless, and the overall color of the entire system changes from green to yellow, the change taking place over a period of about one day. The change from green to yellow immediately apprises one that 50% of the useable shelf life has expired and that while the product is still acceptable, it should be used in the near future. The indicator will remain yellow as long as any of the second alkaline material remains unneutralized. From the design of the device, sufficient hydrochloric acid to neutralize all of the potassium phosphate will be generated at −18°C in the next 120 days and at this point, when all phosphate dianion has been protonated, further generation of acid will react with the methyl red and the indicator will turn from yellow to red. Subsequent release of acid merely intensifies the red color. A user is thus apprised that 90% of the high quality storage life has expired.

If the storage of the product has not been isothermal; e.g., at −18°C, but has involved higher temperatures, the generation of acid will be accelerated, as will the time when the signal occurs. If the package is thus allowed to stand for 5 days at −8°C during its storage, and then returned to −18°C the indicator would signal the 50% level after 125 days rather than 150 days. If held at −18°C for 30 days, then at −8°C for 5 days, allowed to reach 0°C for about 20 hours, then returned to −8°C for 5 days, and finally returned to −18°C, the 50% high quality storage life signal would occur at about 70 to 72 days. More significantly, the change in the rate of acid generation with change in temperature will parallel the change in rate of deterioration with change in temperature as a result of the initial selection of an organic compound having an activation energy appropriate for the $Q_{10}$ of the product. If for example, one were to design indicators for butter, which has a $Q_{10}$ of about 2, or for pork, which as a $Q_{10}$ of about 8, one would select organic compounds having activation energies of about 10 Kcal/mole and 28 Kcal/mole, respectively, in order to achieve this effect.

Example 2

This example describes a time-temperature integrating indicator suitable for monitoring temperature history during high temperature sterilization.

Specifications for heat sterilization of a given product require subjecting the product to a temperature of at least 90±2°C for a period of 30 minutes. If the temperature is raised to 120±2°C, the sterilization is complete in 4 minutes. Utilizing the solvolysis of ethylene chlorohydrin in ethylene glycol, and following the same approach as described in Example 1, the following indicator system is prepared.

| | Ingredient | Parts by volume/indicator |
|---|---|---|
| A. | 1.0 molar aqueous sodium hydroxide | 25 |
| | ethylene glycol | 2000 |
| | 0.04% aqueous bromphenol blue | 20 |
| B. | ethylene chlorohydrin | 50 |

Component A and B are separated until use. Upon mixing and being subjected to a temperature of 90°C, the indicator will develop a blue color after 30 minutes. If the temperature is held at 120°C, the color will develop after 4 minutes.

By increasing the amount of alkaline material, the time of firing can be lengthened. Thus use of 25 parts by volume of the sodium hydroxide solution results in firing after 14 minutes at 120±2°C whereas use of 50 parts by volume doubles this time to 27 minutes.

Where an indicator of this type is used shortly after preparation it is not absolutely necessary to separate the two components if not subjected to excessive temperature since the rate of solvolysis is so slow at normal temperatures that the device is, practically speaking, inactivated.

Example 3

This example demonstrates the control of the reaction half-life utilizing solvent selection. The activation energy for the solvolysis of acetic anhydride in water is from about 16 to about 22 Kcal/mole which corresponds to a $Q_{10}$ of just under 4 to just over 5. However, the half-life of this reaction in pure water is 0.25 sec. which effectively precludes the use of such a system for time-temperature integration. Utilizing the same reaction but replacing the pure aqueous solvent with an inert water miscible solvent permit extension of this half-life. Thus in 40:60 dioxane:water, the half-life is increased to about 71 minutes. Use of 60:40 dioxane:- water increses the half-life to nearly 2 hours. Further extensions are possible by use of increasing proportions of dioxane.

Example 4

This example demonstrates the control of reaction half-life by structural modification. The half-life of phenyl dichloroacetate hydrolysis is about 4 minutes which is too short for most applications. Utilizing the identical hydrolysis of phenyl acetate however, the half-life is increased to approximately 1000 hours, making the reaction ideal for monitoring the time-temperature history of such materials as dairy products. 2,4-Dinitrophenyl acetate can also be employed in the same fashion.

What is claimed is:

1. An indicator system in sealed container operable to signal the attainment of at least one preselected value corresponding to an integral of temperature, to which said system has been exposed, as a function of time, operable to permit visual inspection of the color of its contents comprising:
    a. solvolysis medium, where the solvolysis medium is an aqueous solvent, in the sealed container;
    b. an organic compound in the sealed container which is susceptible to solvolysis by the solvolysis medium said solvolysis following substantially first order kinetics in said medium, said solvolysis resulting in the generation of an acid;
    c. at least one alkaline material in the solvolysis medium of sufficient basicity to neutralize the acid generated the amount of said alkaline material being less than the stoichiometric equivalent of the total amount of acid which can be generated;
    d. at least one pH sensitive indicator in the sealed container which undergoes a discernible color change between the pH value of said alkaline material and the pH value of the acid generated; and
    means for maintaining the solvolysis medium separate from said organic compound;
    whereby causing said solvolysis medium and said organic compound to be mixed at a preselected time results in acid generation at a rate as a function of temperature predetermined by the selection of the solvolysis medium and organic compound; said acid being reacted with said alkaline substance the amount of said alkaline substance being selected so as to correspond to the amount of acid generated during a preselected time temperature integral value; thereby resulting in an excess of acid present at the end of such integral causing said discernible color change of the pH sensitive indicator.

2. The indicator system of claim 1 wherein the alkaline material and the pH sensitive indicator are incorporated in the solvolysis medium.

3. The indicator system of claim 2 wherein the alkaline material comprises sodium hydroxide and potassium phosphate; the indicator comprises xylenol blue and methyl red and the organic compound is tertiary butyl chloride.

4. An indicator system as defined in claim 1 wherein said organic compound is an anhydride, acid halide, ester, or lactone of an organic acid or is a hydrolysable organic halide and said solvolysis medium is an aqueous organic solvent.

5. An indicator system as defined in claim 4 wherein said organic halide is an alkyl halide, an alkenyl halide, an aralkyl halide or an aralkenyl halide.

6. An indicator system as defined in claim 1 wherein there is more than one alkaline substance of significantly different basicities and a corresponding number of indicators, each of said indicators undergoing a discernible color change upon the neutralization of one of said alkaline materials.

7. The indicator system of claim 1 wherein the aqueous solvent comprises ethanol and water.

8. The indicator system of claim 1 wherein the aqueous solvent is water.

9. The indicator system of claim 1 wherein the organic compound is tertiary butyl chloride.

* * * * *